United States Patent
Yankovskiy et al.

(10) Patent No.: US 11,079,944 B2
(45) Date of Patent: Aug. 3, 2021

(54) DYNAMIC PROVISIONING OF CONTAINER STORAGE

(71) Applicant: Zettaset, Inc., Los Altos, CA (US)

(72) Inventors: Maksim Yankovskiy, Mountain View, CA (US); Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 39 days.

(21) Appl. No.: 16/716,934

(22) Filed: Dec. 17, 2019

(65) Prior Publication Data
US 2021/0103395 A1     Apr. 8, 2021

Related U.S. Application Data
(60) Provisional application No. 62/910,769, filed on Oct. 4, 2019.

(51) Int. Cl.
*G06F 3/06* (2006.01)

(52) U.S. Cl.
CPC ............ *G06F 3/0631* (2013.01); *G06F 3/067* (2013.01); *G06F 3/0614* (2013.01); *G06F 3/0653* (2013.01); *G06F 3/0659* (2013.01); *G06F 3/0689* (2013.01)

(58) Field of Classification Search
CPC .............................................. G06F 3/06–0689
See application file for complete search history.

(56) References Cited

U.S. PATENT DOCUMENTS

| | | |
|---|---|---|
| 9,667,725 B1 | 5/2017 | Khanduja et al. |
| 9,740,436 B2 | 8/2017 | Fiebrich-Kandler et al. |
| 2002/0049825 A1* | 4/2002 | Jewett .................. H04L 69/329 709/215 |

(Continued)

FOREIGN PATENT DOCUMENTS

| | | |
|---|---|---|
| KR | 10-2011-0053427 A | 7/2008 |
| KR | 10-2019-1987668 B1 | 7/2018 |

OTHER PUBLICATIONS

Alves, Diogo Luis Barradas, "Implementation of a Private Cloud", Dissertation for Masters Degree, Universidade Nova de Lisboa, Sep. 1, 2016, pp. 1-60, Universidade Nova de Lisboa, Lisbon, Portugal.

(Continued)

*Primary Examiner* — Nicholas J Simonetti
(74) *Attorney, Agent, or Firm* — Asif Ghias

(57) ABSTRACT

Techniques are disclosed for dynamically allocating storage for containers/applications in a containerized environment. In various aspects, one is able to specify the amount of storage desired/required in a storage/host volume to be allocated to a container on-demand. The containerized environment may employ its own hardware resources or be implemented on an infrastructure-as-a-service (IaaS). The containerized application for which an instant dynamically allocated storage volume is created may be a composable multi-container or microservices application. The storage volume is optimally assembled from the partitions of the storage devices available on a host. The storage devices may be local to the host or remote or in the cloud. Techniques are also disclosed for decommissioning a previously allocated storage volume based on the present design.

20 Claims, 11 Drawing Sheets

(56) References Cited

U.S. PATENT DOCUMENTS

| | | | |
|---|---|---|---|
| 2009/0198791 A1* | 8/2009 | Menghnani | G06F 3/0608 709/215 |
| 2011/0314534 A1 | 12/2011 | James | |
| 2012/0089806 A1* | 4/2012 | Yoshioka | G06F 12/0292 711/173 |
| 2013/0067242 A1 | 3/2013 | Lyakhovitskiy et al. | |
| 2013/0204849 A1* | 8/2013 | Chacko | G06F 3/0641 707/692 |
| 2014/0053150 A1 | 2/2014 | Barnett et al. | |
| 2014/0109086 A1 | 4/2014 | Mizrahi et al. | |
| 2014/0245016 A1 | 8/2014 | Desai et al. | |
| 2015/0033224 A1 | 1/2015 | Maheshwari et al. | |
| 2015/0277897 A1* | 10/2015 | Deng | H04W 8/245 717/169 |
| 2016/0378353 A1* | 12/2016 | Schmisseur | G06F 3/0604 711/114 |
| 2017/0083532 A1 | 3/2017 | Kottomtharayil et al. | |
| 2017/0102960 A1* | 4/2017 | Dwarampudi | G06F 3/0619 |
| 2017/0302589 A1 | 10/2017 | Leafe et al. | |
| 2018/0095872 A1 | 4/2018 | Dreier et al. | |
| 2018/0300075 A1 | 10/2018 | Fernandez et al. | |
| 2019/0251279 A1 | 8/2019 | Emberson et al. | |
| 2019/0278506 A1 | 9/2019 | Richardson | |
| 2019/0286373 A1 | 9/2019 | Karumbunathan et al. | |

OTHER PUBLICATIONS

Cheng Yue, "Workload—aware Efficient Storage Systems", Dissertation for PhD in Computer Science and Applications, Jun. 22, 2017, pp. 1-134, Virginia Polytechnic Institute and State University, Blacksburg, VA, USA.

Faria, De M. Heitor, A Backup-as-a-Service (BaaS) Software Solution, Disseration for Professional Master in Applied Computing, Department of Computer Science, University of Brazil, Jul. 1, 2018, pp. 1-73, University of Brazil, Brasilia, Brazil.

Portworx, "Encrypted volumes using pxctl", Portworx, Sep. 20, 2019, https://docs.portworx.com/reference/cli/encrypted-volumes/#encrypted-volumes, Los Altos, CA, USA.

Shariffdeen, Ridwan et al., "inteliScaler—Workload and Resource Aware, Proactive Autoscaler for PaaS Cloud Frameworks", Report for the partial fulfillment of Bachelor of Science Degree, University of Moratuwa, Feb. 21, 2016, pp. 1-91, University of Moratuwa, Sri Lanka.

Tihfon, Gemoh Maliva et al., "An efficient multi-task PaaS cloud infrastructure based on docker and AWS ECS for application deployment", Cluster Computing, Jul. 23, 2016, pp. 1585-1597, vol. 19(3), Springer Science+Business Media, New York, USA.

Yousafzai, Abdullah et al., "Cloud resource allocation schemes: review, taxonomy, and opportunities", Knowledge Information Systems, May 12, 2016, pp. 347-381, vol. 50(2), Springer-Verlag, London, United Kingdom.

* cited by examiner

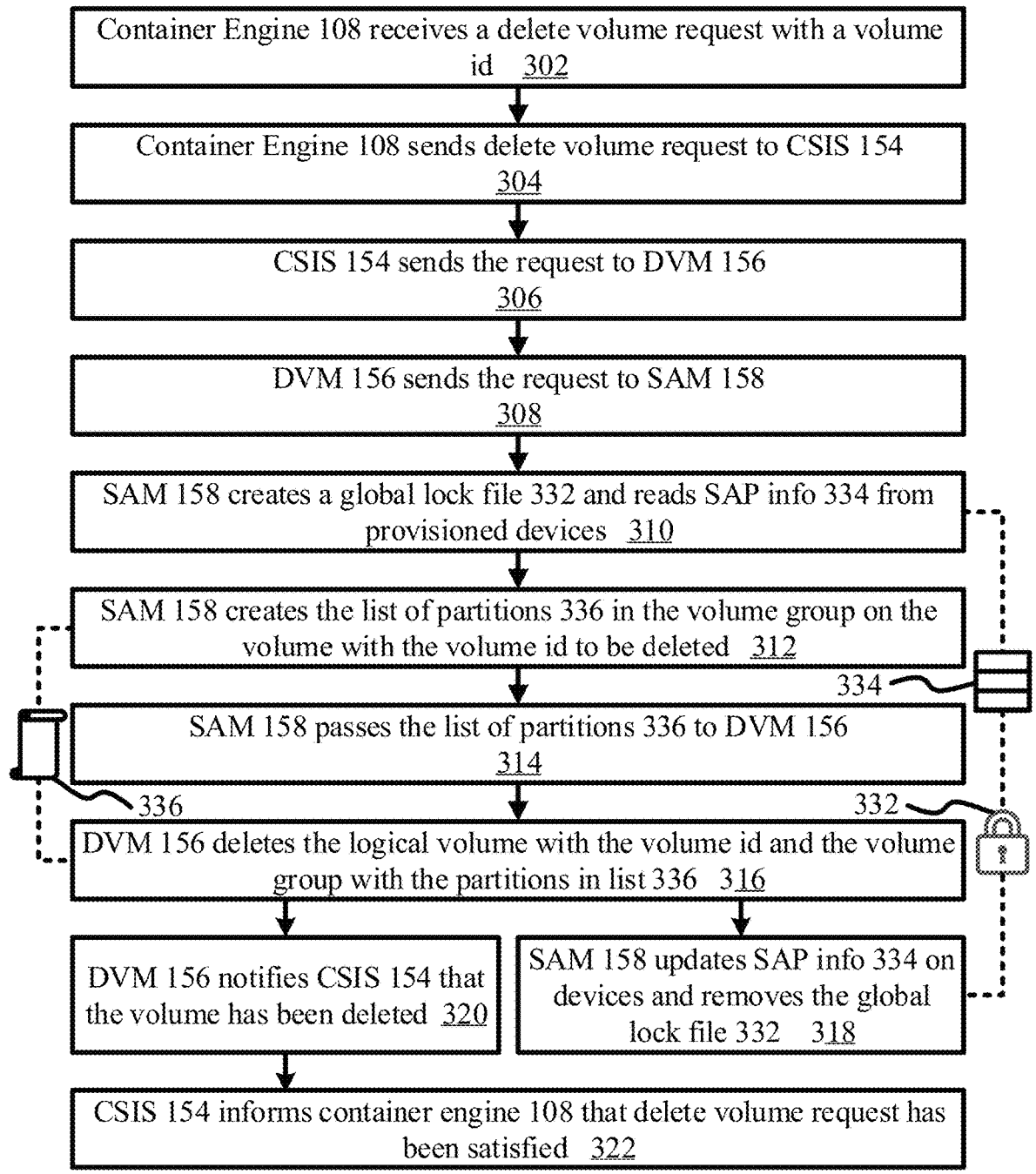

```
[docker@localhost deploy]$ sudo /usr/share/zts/bin/zts_xcrypt_docker_add_device.sh /dev/sdb          ～404
[sudo] password for docker:
2019-11-25 14:266:15.518    INFO 12391 --- [           main] c.z.c.vmanager.config.Application
Ts-volume-driver-config-8.5.0-SNAPSHOT.jar started by root in /usr/share/zts/lib)
2019-11-25 14:266:15.523    INFO 12391 --- [           main] c.z.c.vmanager.config.Application
2019-11-25 14:266:15.604    INFO 12391 --- [           main] c.z.c.vmanager.config.Application
2019-11-25 14:266:15.657    INFO 12391 --- [           main] c.z.c.container.commons.utils.ShUtils
2019-11-25 14:266:15.755    WARN 12391 --- [           main] c.z.c.commons.dal.SimpleQueryDao
2019-11-25 14:266:15.756    INFO 12391 --- [           main] c.z.c.container.commons.utils.ShUtils
2019-11-25 14:266:15.833    INFO 12391 --- [           main] c.z.c.container.commons.utils.ShUtils
2019-11-25 14:266:15.981    INFO 12391 --- [           main] c.z.c.container.commons.utils.ShUtils
2019-11-25 14:266:15.033    INFO 12391 --- [           main] c.z.c.container.commons.utils.ShUtils
2019-11-25 14:266:15.120    INFO 12391 --- [           main] c.z.c.container.commons.utils.ShUtils
2019-11-25 14:266:15.204    INFO 12391 --- [           main] c.z.c.container.commons.utils.ShUtils
2019-11-25 14:266:15.258    INFO 12391 --- [           main] c.z.c.container.commons.utils.ShUtils
2019-11-25 14:266:15.335    INFO 12391 --- [           main] c.z.c.container.commons.utils.ShUtils
2019-11-25 14:266:15.419    INFO 12391 --- [           main] c.z.c.container.commons.utils.ShUtils   402A
2019-11-25 14:266:15.556    INFO 12391 --- [           main] c.z.c.container.commons.utils.ShUtils
2019-11-25 14:266:15.685    INFO 12391 --- [           main] c.z.c.container.commons.utils.ShUtils
2019-11-25 14:266:15.849    INFO 12391 --- [           main] c.z.c.container.commons.utils.ShUtils
2019-11-25 14:266:15.002    INFO 12391 --- [           main] c.z.c.container.commons.utils.ShUtils
2019-11-25 14:266:15.203    INFO 12391 --- [           main] c.z.c.container.commons.utils.ShUtils
2019-11-25 14:266:15.538    INFO 12391 --- [           main] c.z.c.container.commons.utils.ShUtils
2019-11-25 14:266:15.667    INFO 12391 --- [           main] c.z.c.container.commons.utils.ShUtils
2019-11-25 14:266:15.993    INFO 12391 --- [           main] c.z.c.container.commons.utils.ShUtils
2019-11-25 14:266:15.066    INFO 12391 --- [           main] c.z.c.container.commons.utils.ShUtils
2019-11-25 14:266:15.427    INFO 12391 --- [           main] c.z.c.container.commons.utils.ShUtils
Defaults 0 0 >> /etc/fstab]
Hibernate: select configenti0_.id as id1_0_, configenti0_.slicing_factor as slicing_2_0_ from config.
Saving new device sdb, /dev/sdb with slicing factor 100MB in Volume Manager configuration...
Hibernate: select configenti0_.id as id1_0_, configenti0_.slicing_factor as slicing_2_0_ from config.
Hibernate: insert into config.config (id, slicing_factor) values (default, ?)
Hibernate: values identity_val_local()
Hibernate: insert into config.devices (id, sevice, name, slicing_factor) values (default, ?, ?, ?)
Hibernate: values identity_val_local()
Hibernate: insert into config_devices (config_entity_id, devices_id) values (?, ?)
2019-11-25 14:266:15.604    INFO 12391 --- [           main] c.z.c.vmanager.config.Application
```

```
: Starting Application on localhost.localdomain with PID 12391 (/usr/share/zts/lib/z
: No active profile set, falling back to default profiles: default
: Zettaset Volume Manager config initializer!
: Executing command [sudo find dev.sdv -bane sdb]
: Failed to execute query select * from config.devices where name=sdb
: Executing command [sudo lsblk -bp -o KNAME /dev/sdb]
: Executing command [sudo fdisk -l | grep /dev/sdb]
: Executing command [sudo wipefs -a /dev/sdb]
: Executing command [sudo parted /dev/sdb mklabel gpt]
: Executing command [sudo parted /dev/sdb mkpart primary ext4 2048s 22525s ]
: Executing command [sudo blockdev -getsz /dev/sdb]
: Executing command [sudo parted /dev/sdb mkpart primary ext4 24576s 229376s ]
: Executing command [sudo parted /dev/sdb mkpart primary ext4 231427s 436224s ]
: Executing command [sudo parted /dev/sdb mkpart primary ext4 438272s 643072s ]
: Executing command [sudo parted /dev/sdb mkpart primary ext4 645120s 849920s ]
: Executing command [sudo parted /dev/sdb mkpart primary ext4 851968s 1056768s ]
: Executing command [sudo parted /dev/sdb mkpart primary ext4 1058816s 1263616s ]
: Executing command [sudo parted /dev/sdb mkpart primary ext4 1265664s 1470464s ]
: Executing command [sudo parted /dev/sdb mkpart primary ext4 1472512s 1677312s ]
: Executing command [sudo lsblk -bp -o KNAME | grep /dev/sdb]
: Executing command [sudo mkfs ext4 /dev/sdb1]                                    ext4
: Executing command [sudo mkdir -p /mnt/zts/dev/sdb1]
: Executing command [sudo mount /dev/sdb1 /mnt/zts/dev/sdb1]
: Executing command [sudo echo /dev/sdb1 /mnt/zts/dev/sdb1
.config configenti0_
.config configenti0_

Started Application in 40.93 seconds (JVM running for 41.983)
```

Fig. 8B

```
[docker@localhost ~]$
[docker@localhost ~]$ docker volume create -d ztsvolume --name zts-test-vol --opt size=500mb
zts-test-vol
[docker@localhost ~]$
[docker@localhost ~]$
[docker@localhost ~]$ docker volume ls
DRIVER              VOLUME NAME
local               03a571275e70704254dfa21584613054%d6263b1342dd2019la21a62bdaaa47
local               223dc47a64775d04b0l0e63ee6b0dc513809958f2ff4a741ff593c62c13b12c
local               615a146e2f39a13950054e93a8780558a80c52a41c46d67d32ff9bda33e0c56
local               0bba0b5325c6034c978a5df87e2814db44c72154fdcd978455320c50a0de343
local               856b4e909a19725fc54b16720eb7d62953fdddaba4493f65006d3d2cf19c5744
local               87e49da4ae6f7d53f567e55b63a b775bd608403 7e4c3 db370f07ec8a7d9ab36e
local               b6a8f145b1e7fe1b0f10616f1a43ef74d4327edfffbe0521%e372lff03c573f
local               b9039f063sdb9a8744ee20000769c012877cce5a3ef6885 3cddcfd72b5126110
local               da476b534d5383 2e0b56f55d0bd9161af83e07333 6c356b172f0fd5aec2e28
local               da735e09b45382 67aa5c7b26ac6%896 2f9cfd26d94df375adbdad777ab64562a
local               fd91137c6906c14b10b6e09bebd0b13b37b3d273b91e792263d33d4b6f0bc5f
ztsvolume           zts-test-vol
```

*Fig. 9*

```
[docker@localhost ~]$ docker run --name zts-test1 -v zts-test-vol:/var/lib/mysql -e MYSQL_ROOT_PASSWORD=    -d mysql:latest
4d53d337e5f86004cd46baae3b630c2f508536fb5bf736271fbefc5118fca6a
[docker@localhost ~]$
[docker@localhost ~]$
[docker@localhost ~]$ docker exec -it ztest1 mysql -uroot -p
Error response from daemon: No such container: ztest1
[docker@localhost ~]$ docker exec -it zts-test1 mysql -uroot -p
Enter password:
Welcome to the MYSQL monitor. Commands end with ; or \g.
Your MySQL connection id is 10
Server version: 8.0.18 MySQL Community Server - GP
Copyright (c) 2000, 2019, Oracle and/or its affiliates. All rights reserved.
Oracle is a registered trademark of Oracle Corporation and/or its
Affiliates. Other names may be trademarks of their respective
Owners.

Type 'help;' or '\h' for help. Type '\c' to clear the current input statement.
mysql>
mysql>
mysql> use sakila;
Reading table information for completion of table and column names
You can turn off this feature to get a quicker startup with -A
Database changed
mysql>
mysql> show tables;
+----------------------------+
| Tables_in_sakila           |
+----------------------------+
| actor                      |
| actor_info                 |
| address                    |
| category                   |
| city                       |
| country                    |
| customer                   |
| customer_list              |
| film                       |
| film_actor                 |
| film_category              |
| film_list                  |
| film_text                  |
```

DYNAMIC PROVISIONING OF CONTAINER STORAGE

RELATED APPLICATIONS

This application claims priority from U.S. Provisional Patent Application No. 62/910,769 filed on 4 Oct. 2019 and which is incorporated herein by reference for all purposes in its entirety.

FIELD OF THE INVENTION

This invention generally relates to dynamic allocation of persistent storage for containers and micro services.

BACKGROUND ART

Storage allocation continues to be an important aspect of computing architecture and design. It is especially important in containerized environment where containers are spawned dynamically for running applications and services. While there are many techniques that address the issue of storage allocation for containers and their applications, these techniques rely on static allocation of storage.

For allocating storage via storage volumes, the prevailing techniques do not give control to a container/application over specifying the amount of storage needed. In other words, while making a request to allocate a storage volume to a container/application, the operator/user is unable to specify the amount of storage desired or required in the storage volume. Thus, there is no ability for the prevailing techniques to dynamically or elastically assemble storage volumes on-demand of a required/desired size and then assign it to the container.

In prior art, U.S. Pat. No. 9,740,436 B2 to Fiebrich-Kandler et al. discloses a mechanism of data processing system for elastic data storage management in a storage network. A data storage system manager in the data processing system monitors remaining free space of a plurality of data storage systems. The data storage system manager determines a rate of change of remaining free space of each data storage system. Responsive to determining that the remaining free space or rate of change of remaining free space of at least one data storage exceeds a threshold, the data storage system manager determines an amount to expand or shrink a given data storage system in the storage network. The data storage system manager configures data storage allocation to expand or shrink the given data storage system by the determined amount.

U.S. Patent Publication No. 2019/0286373 A1 to Karumbunathan et al. teaches servicing I/O operations in a cloud-based storage system. These operations include receiving, by the cloud-based storage system, a request to write data to the cloud-based storage system and storing the data in solid-state storage of the cloud-based storage system. They also include storing the data in object storage of the cloud-based storage system, and detecting that at least some portion of the solid-state storage of the cloud-based storage system has become unavailable. They also include identifying data that was stored in the portion of the solid-state storage of the cloud-based storage system that has become unavailable. The I/O operations also include retrieving from object storage the data that was stored in the portion of the solid-state storage that has become unavailable and storing the retrieved data in solid-state storage of the cloud-based storage system.

U.S. Patent Publication No. US 2017/0302589 A1 to Leafe et al. teaches providing a plugin interface for a cloud computing system. The publication discloses plugin interfaces for a compute service, object service, network service, authentication and authorization service, message service, and image service. One or more of the plugin interfaces can be used to alter the allocation of virtual to physical resources across multiple services. The reference further teaches that compound services and smart allocation facilities are possible with user-directed modification.

Ph. D. dissertation of Ali R. Butt et al. of Virginia Polytechnique Institute entitled "Workload-aware Efficient Storage Systems", dated Jun. 22, 2017 discusses a workload-aware storage management model. They propose a design and data management and storage systems by applying a simple yet effective rule-workload awareness. They find that simple workload-aware data management strategies are effective in improving the efficiency of modern storage systems, sometimes by an order of magnitude. Their work tackles the data management and storage space allocation issues at distributed and cloud storage level. It also focuses on low-level data management problems in the local storage system, which many high-level storage/data-intensive applications rely on.

FIG. 1 shows a typical containerized environment 10 of prior art. Containerized environment 10 has a host system 12 comprising a hardware or an infrastructure layer 14 and an operating system (OS) layer 16 running on infrastructure/hardware 14. Also shown in FIG. 1 is a container engine 18 executing containers 1, 2, 3, 4, 5, . . . represented by reference numerals 20, 22, 24, 26, 28, . . . Container engine 18 is a component of the containerization software/solution/suite necessary to support containerized environment 10. In particular, container engine 18 is responsible for managing the lifecycles of containers 20, 22, . . . . Exemplary containerization solutions available in the art include Docker™, Red Hat OpenShift™, rkt, etc.

Also shown in FIG. 1, is a file storage mechanism 30 comprising various storage devices or disks as shown. In such a typical prior art system 10 as shown, when container 1 needs storage space, it makes a request to container engine 18 for either creating a new volume or mounting an existing one. The request contains the filesystem path on storage 30 where the volume will be created or is already located. The size of available storage on the path is predetermined and container 1 has no control over it. In other words, container 1 cannot specify the size of the space required in the volume in the above request to container engine 18.

The determination of the amount storage space that is sufficient must be made by container 1 beforehand. If the required storage space is large, the user of container 1 typically contacts an administrator 40 of environment 10 in advance to ensure that sufficient space is available on a given filesystem path in storage 30. As a result, administrator 40 then typically determines the amount of available storage on various storage devices in storage 30.

If needed, admin 40 would install additional hard drives in storage 30 and/or "combine" physical volumes into a new volume group or to extend an existing volume group. He/she would then create a logical volume over the volume group of the size requested by the above user and then subsequently create a filesystem of the required type on it. This volume will have a volume id and a path in storage 30. Admin 40 would then manually notify the above user that sufficient space on the above path is now available in storage 30. Based on this information, the operator/user of container 1 can now create a storage volume on this path or change the mountpoint of an existing volume to this path if needed for container 1.

Needless to say, the above process is almost entirely manual between the user/container 1 and admin 40. It is thus tedious and prone to errors and inefficiencies. As will be taught by this specification and drawing figures, the instant design of dynamic/elastic storage for containers automates the above process and dynamically allocates storage to containers 1, 2, . . . as needed.

Furthermore, using the techniques of the prior art, it is also not possible to provide encryption on storage volume such that multiple containers do not share the same host volume. For example, Portworx solution allows creating encrypted host volumes for containers but lacks dynamic volume management of the present design as well as proper key management infrastructure to make the solution complete and secure.

OBJECTS OF THE INVENTION

In view of the shortcomings of the prior art, it is an object of the invention to provide a dynamic or elastic storage mechanism for containers and their applications. The dynamic storage mechanism would allow one to specify the amount of storage that is required for the container/application on-demand.

It is also an object of the invention to assemble a storage or host volume of a given size from the partitions of all storage devices available at the host.

It is also an object of the invention to assemble the required storage volume in an optimal manner.

It is yet another object of the invention to provide the above dynamic storage capabilities on storage devices that may be local to the host or remote.

Still other objects and advantages of the invention will become apparent upon reading the summary and the detailed description in conjunction with the drawing figures.

SUMMARY OF THE INVENTION

A number of objects and advantages of the invention are achieved by apparatus and methods designed for providing dynamic or elastic storage system/mechanism or simply dynamic/elastic storage in a containerized environment. Various embodiments of such a containerized environment based on instant principles, may be implemented on a commercially available infrastructure-as-a-service (IaaS) without necessarily using local hardware/equipment.

A container is a lightweight virtualization mechanism that leverages the operating system and hardware of the host machine and creates a contained environment in which one or more processes execute. The container behaves as if it had its own hardware and operating system. A container engine executing on the host machine is responsible for managing the lifecycle of containers on the host. Persistent storage in a containerized environment is provided via storage volumes.

According to the chief aspects, the container engine issues a create volume request for creating a storage volume of a required size. Such a request may originate from a container or application that sends the request to the container engine, or it may be made by an operator/user via an interface connecting to the container engine. Further, there is also a separate storage configuration manager (SCM) module of the dynamic container storage of the present design. SCM, running on the host, is responsible for provisioning and partitioning of storage devices for instant dynamic storage.

The container engine passes the above create volume request to a container storage integration service (CSIS) or driver operating/integrated with the container engine. The CSIS in turn passes the request to a dynamic volume manager (DVM) of the present technology. The DVM interfaces with a storage allocation module (SAM) and requests a volume of the required size of the original create volume request. For this purpose, SAM first creates a global lock file and then reads the first partition of each storage device provisioned on the host. As noted above, instant SCM is responsible for partitioning of the storage devices.

The first partition, also referred to as the "dm" partition, contains the storage allocation persistence (SAP) information of the device. In the preferred embodiment, SAM reads in the SAP information and creates an allocation information structure (AIS) in memory. The SAP information and in-memory AIS that it is built from, contains the partition ids of the partitions on the device and a flag indicating whether or not that partition is available or unallocated. The in-memory nature of AIS provides for high performance of the technology according to the present principles.

SAM then creates or assembles an optimal list of unused/unallocated partitions of all the storage devices connected and provisioned on the host, such that the total size of the partitions on the optimal list meets or just exceeds the required volume size. It then passes this optimal list of partitions, and more specifically partition ids, to the DVM. DVM then creates a logical volume over these partitions with an associated volume id. In a highly preferred embodiment, SAM allocates the largest available partitions of the storage devices first, in a "greedy" fashion while creating the above optimal list. It then modifies this greedy allocation by removing excess storage from the optimal list.

In another preferred embodiment, DVM first creates a volume group on the partitions and then a logical volume over the volume group. SAM then updates SAP information to mark those partitions that are in the above logical volume as used/unavailable. More specifically, it updates its in-memory AIS first. It then writes the SAP information in the first partitions of the affected storage devices and removes the global lock file. At this point, DVM passes the volume id of the dynamically created new volume to CSIS, which in turn passes it to the container engine to fulfill the above create volume request.

The operation/process for decommissioning or deleting a storage volume previously created by the above dynamic container system proceeds in a converse manner. Specifically, a delete volume request is originated, such as by entering a command on the interface of the container engine. The request contains the volume id of the storage volume to be deleted. The container engine passes this request to CSIS which passes it to SAM along with the volume id.

SAM creates a global lock file and then reads the dm partitions of each partition in the volume. Preferably it reads this information into an in-memory AIS. SAM also creates a list of the partitions in the volume to be deleted and passes this list to DVM. DVM then deletes the volume and preferably also any underlying volume group of the partitions in the list. SAM now marks those partitions in AIS as available/unused and writes SAP in the dm partitions of the affected devices and then deletes the global lock file.

In the preferred embodiment, the container environment above is a Docker™ or docker container environment and CSIS above is implemented as a docker volume driver. In alternate embodiments, CSIS is implemented using Kubernetes™ container storage interface or CSI. The storage devices may advantageously be provided locally on the host machine. Preferably, they are on a storage area network (SAN) and/or are network attached storage (NAS) devices. They may include redundant array of independent disks (RAID) devices. Preferably still, the storage devices are remote storage devices, including cloud storage, such as Amazon Web Services (AWS™) or Microsoft Azure™ storage, Google Cloud storage, etc.

In embodiments based on a docker implementation, the create volume request is preferably generated as a result of a modified "docker run" command and more specifically a "docker run -v" command. In other variations of docker implementation, the create volume request is preferably generated as a result of a modified "docker volume create" command. In such a modified command based on the present techniques, the required storage size for the volume required for the container is also specified on-demand. Preferably, it is a composable multi-container application that persists data on the storage volume created by dynamic/elastic container storage above. Such an application may be "microservices" application known in the art and running on containers.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

FIG. 7 shows the converse steps of the flowchart FIG. 5 for decommissioning/deconstructing/destroying a storage volume previously created by the instant dynamic storage.

Figure 1:
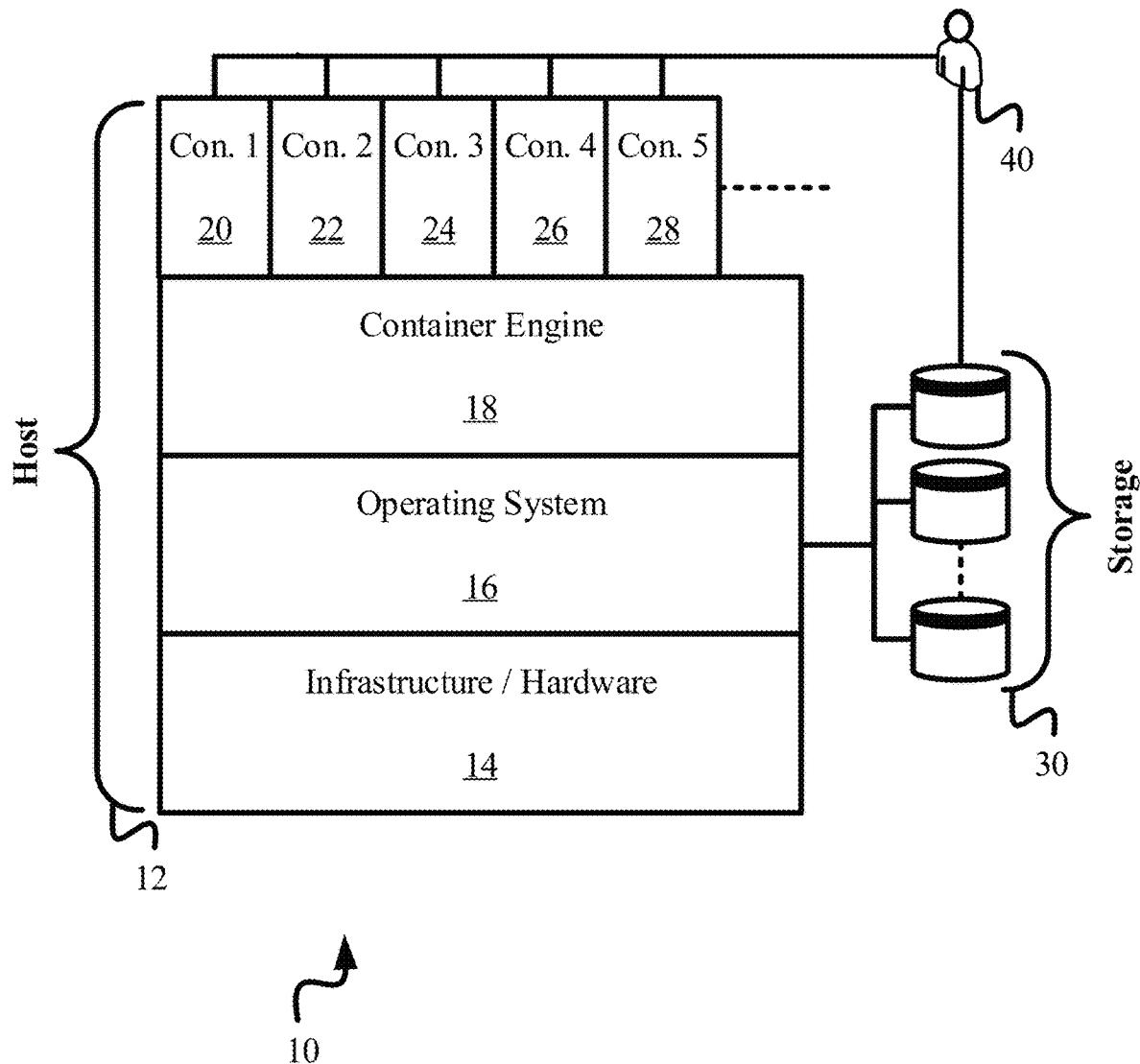
FIG. 1 is a block-level diagram of a typical containerized environment of the prior art.

FIG. 8A-B present a single screenshot split into left and right sections from an exemplary implementation of the present design in a Linux environment running Docker™ software.

FIG. 9 presents a screenshot showing a modified docker volume create command being used to create a storage volume based on the present design.

FIG. 10 presents a screenshot showing the creation of a docker container running a MySQL database with the storage volume created in screenshot of FIG. 9 above.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The techniques described herein may employ computer code that may be implemented purely in software, hardware, firmware or a combination thereof as required for a given implementation. The present invention will be best understood by first reviewing the systems and methods for dynamically allocating storage for a containerized environment as illustrated in FIG. 2. As will be taught herein, containerized environment 100 is an improvement upon the prior art containerized environment shown and explained in the background section in reference to FIG. 1.

Containerized environment 100 of FIG. 2 shows a host system 102 comprising a hardware or an infrastructure layer 104 and an operating system (OS) layer or simply OS 106 running on infrastructure/hardware layer or simply infrastructure or hardware 104. While in some embodiments it is conceivable that infrastructure 104 physically belongs to host 102, in alternative embodiments it is also possible that infrastructure 104 is provided on top of an infrastructure-as-a-service (IaaS) known in the art. Exemplary IaaS solutions available in the industry include Amazon Web Services (AWS), Microsoft Azure, Rackspace Open Cloud, Google Cloud Platform, HP Enterprise Converged Infrastructure, IBM SmartCloud Enterprise, Green Cloud Technologies, etc.

Therefore, OS 106 may execute on the hardware of a host machine or atop an IaaS layer provided by an IaaS provider such as the ones mentioned above. In the latter scenario, OS 106 may be provided as a part of the IaaS offering/solution itself from an IaaS provider. The present design is agnostic of the many ways in which infrastructure 104 and operating system 106 of the containerized environment 100 may be provisioned for various implementations.

Containerized environment 100 of FIG. 2 also shows a container engine 108 executing containers 1, 2, 3, 4, 5, . . . represented by reference numerals 120, 122, 124, 126, 128, . . . . Each container is a lightweight virtualization mechanism that leverages operating system 106 and hardware/infrastructure 104 in a contained environment in which one or more processes execute. The container behaves as if it had its own hardware and operating system. Container engine 108 is a component of the containerization software/solution/suite necessary to manage the containers. In particular, container engine 108 is responsible for managing the lifecycles of containers 120, 122, . . . . Exemplary containerization solutions available in the industry include Docker, Red Hat OpenShift, rkt, etc.

Also shown in FIG. 2, is a dynamic container storage mechanism or module or simply dynamic container storage mechanism/subsystem/system or simply dynamic container storage 150 of the present design. Persistent storage for containers 1, 2, . . . on dynamic container storage 150 is provided via host volumes or storage volumes as will be discussed herein. The present techniques of dynamic storage allocation for containers apply to any of the above-referenced industry solutions for infrastructure 104, operation system 106 and container engine 108.

However, for convenience and clarity, several exemplary implementations described herein may make specific references to Docker containers with their associated constructs on a Linux operating system. Container engine 108 is typically implemented using a client/server model, with a client interface that interacts with a backend server or daemon. The client interface is typically a command line interface (CLI) communicating with the backend daemon on a network.

In a containerized environment such as environment 100 of FIG. 2, the main types of users are administrator users or admins, developer users or simply developers and operator users or simply operators. The users for environment 100 are not shown explicitly in FIG. 2 to avoid clutter. An administrator's responsibility is to ensure the overall well-being of the environment, its users and resources. The developers are in charge of developing the containerized applications, such as applications 1, 2, and 3 shown in FIG. 2. The operators are responsible for operating the containerized applications according to their specific objectives. Note, that at times the various roles of the users above may also overlap with one another as needed.

An operator typically issues commands on the above-mentioned CLI of container engine 108 to accomplish various tasks for the containerized applications. For example, the operator may issue commands to instantiate a container with a specific configuration required for an application. Such a configuration includes specifying the container image of the container, its working directory, list of required packages, network ports communicable externally to the container, any environment variables and the name of the executable file for the application to be run in the container. Based on the present technology, the required configuration may also include the amount of storage space required for the container/application as will be further taught below.

A container image, or simply an image, is a file comprising instructions for a complete and executable version of an application. It also includes definitions about the operating environment, root file system, other attached/mounted file systems, networking, and operating modules, as well as any other components of a complete execution environment. An image specifies the system libraries, tools, and other files and dependencies for the executable code. An operator can create one or multiple containers based on a given container image. Image developers can reuse static image layers for different projects.

As mentioned, an operator user of containerized environment 100 of FIG. 2 instantiates a container or containers from the above-mentioned interface of container engine 108. Depending on the containerization software used in environment 100, the operator may do so in a number of ways. One such way is to execute a standalone command at the CLI that creates a container with an image and executes an application in it. In the case of docker containerization software, this command may be "docker run". In this scenario the required configuration of the container is specified in a configuration file, e.g. "dockerfile".

An alternate way is to start a service in a container. A service is a component of an overall "composable" application. An exemplary application 1 is shown as executing in containers 1, 2 and 3, and exemplary applications 2 and 3 in containers 4 and 5 respectively in FIG. 2. In the case of docker software, the required configuration of a multi-container composable application is typically specified in a configuration file, e.g. a "docker-compose.yaml" file. The application may also be a microservices application running on any number of containers in containerized environment 100. Any number of containers, applications, and storage devices may be present in the containerized environment.

After having described the basic structure of the containerized environment 100 of FIG. 2, let us now look at the main embodiments of the present technology in greater detail. Note first that in the present teachings for brevity, unless otherwise noted, we may refer to the container or the operator issuing commands on its behalf synonymously. Furthermore, the commands may be issued manually on a CLI such as the one discussed above, or specified in a script or a configuration file as will be appreciated by those skilled in the art.

Regardless of how a container is instantiated, the operator can specify one or more host volumes or storage volumes to be required for the container. For example, in the case of docker software, the operator may issue a "docker run" or a "docker service create" command along with a "-v" option/flag for creating a new storage volume. Alternatively, the operator may specify a "-mount" option for mounting an existing storage volume. These options/flags respectively signal a request to container engine 108 to create a storage volume or to mount an existing one for the requesting container.

Figure 2:
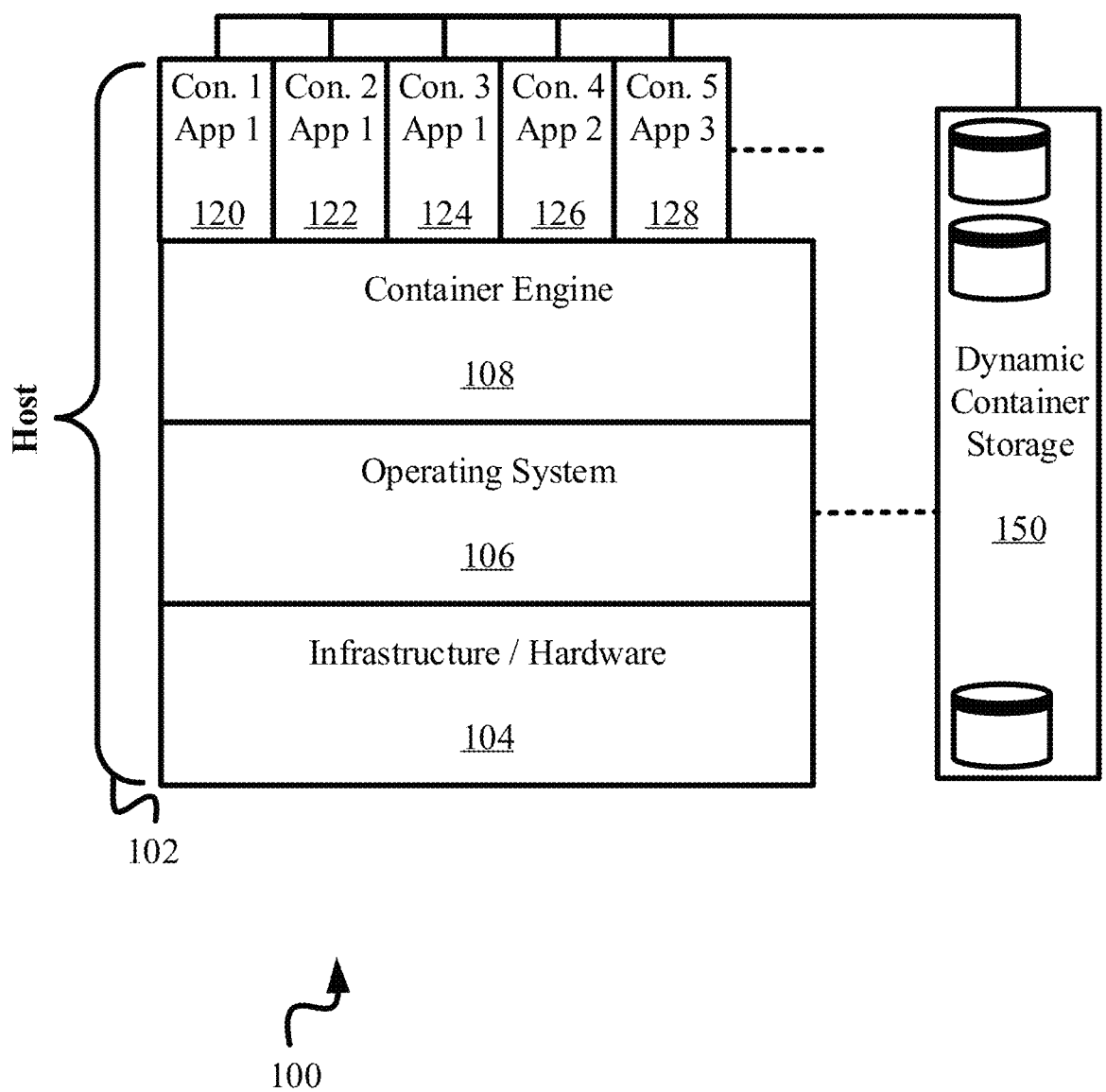
FIG. 2 is a block-level diagram of an improved containerized environment including a dynamic/elastic container storage of the present design.

As explained in the background section in reference to FIG. 1, while issuing the above-referenced request for creating a volume in the prevailing systems, the operator has no control over specifying the amount of storage needed in the volume. As an improvement over the prior art according to the present techniques, such a request can now be accompanied by an option/flag/parameter for specifying the required size of storage. The flag in the request specifies the amount of storage needed on-demand in dynamic or elastic container storage 150 for the specified volume. Exemplarily, this may be done using a "-size" flag/option along with a "docker run -v" or "docker service create" or a "docker volume create" request/command. Container engine 108 then passes such a request to dynamic container storage mechanism 150 of FIG. 2 that dynamically provisions/allocates storage volume of the required size for the container. More than one such requests with -v flags may be specified along with respective -size flags to request multiple storage volumes of the requisite sizes.

Figure 3:
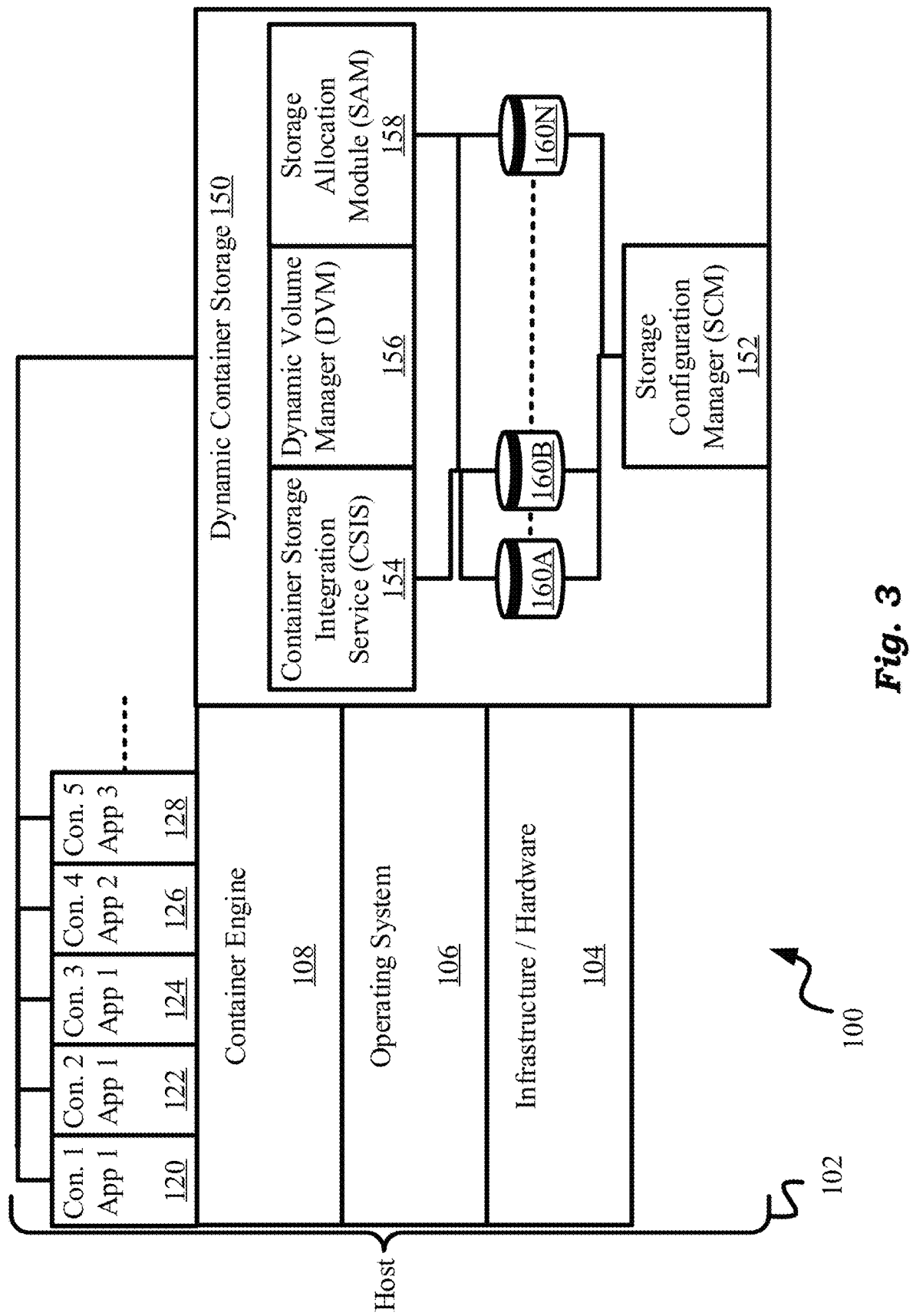
FIG. 3 shows the dynamic container storage of the containerized environment of FIG. 2 in an expanded form.

To understand in detail the techniques behind the workings of instant dynamic container storage 150 of the present design, let us now refer to the embodiment shown in FIG. 3. FIG. 3 shows many of the same elements of FIG. 2 but with dynamic container storage 150 shown in its expanded form. More specifically, FIG. 3 shows that dynamic storage 150 comprises a storage configuration manager or module or subsystem (SCM) 152 running on host 102. SCM is responsible for provisioning and partitioning of storage devices 160A, 160B, . . . 160N of dynamic container storage 150 shown in FIG. 3. Note that there may be other storage devices configured on the host not under the purview of SCM 152. In other words, SCM 152 is in charge of provisioning/partitioning only those devices that may be used by instant dynamic container storage 150.

Figure 4:
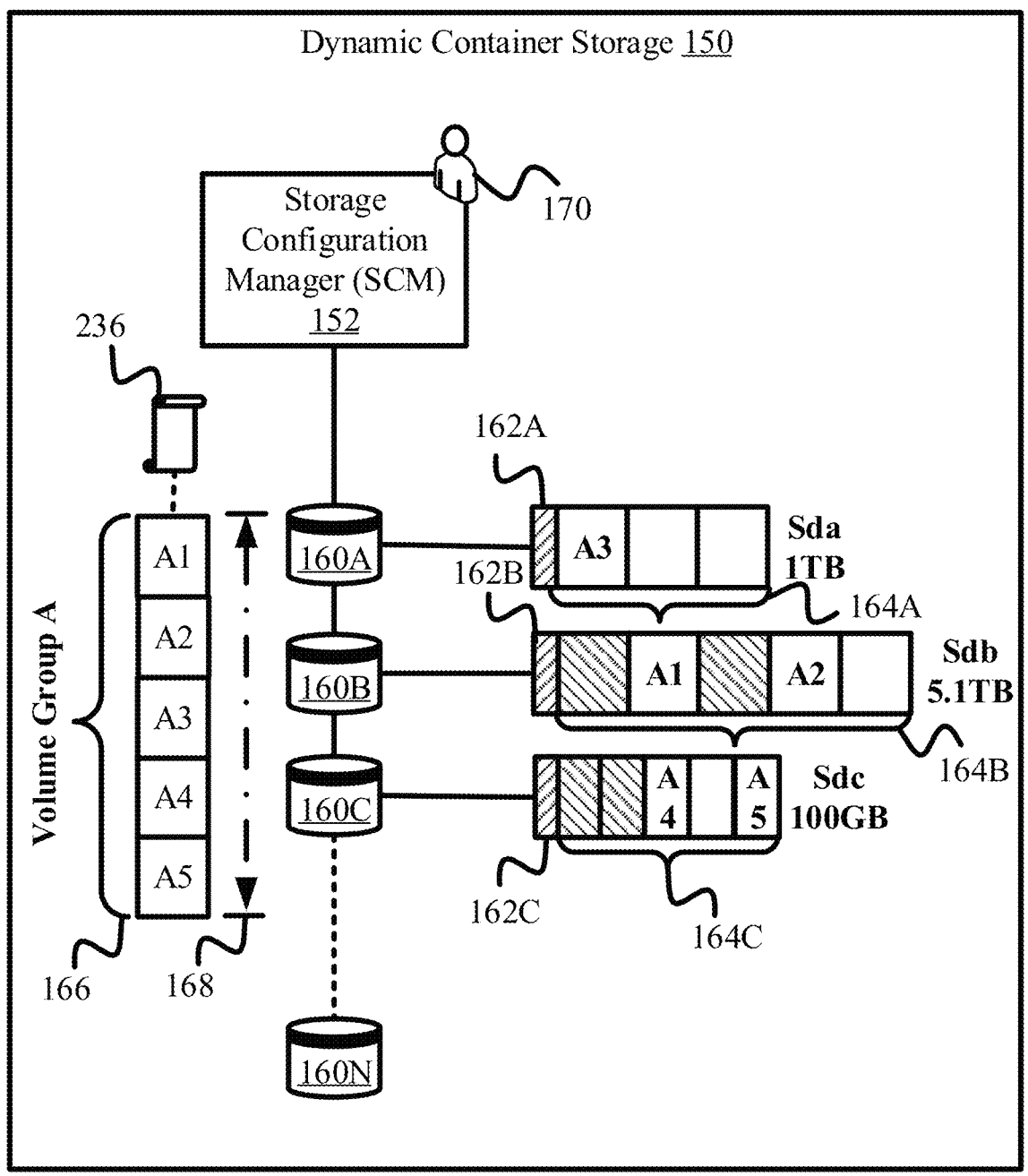
FIG. 4 shows the storage devices of FIG. 2-3 with their partitions/slices/allocation units and an assembled storage volume based on the instant techniques.

In the preferred embodiment, SCM is a standalone component or program of dynamic container storage mechanism 150, that is used by an administrator. In order to better understand the working of SCM 152, let us now take advantage of FIG. 4. FIG. 4 shows storage devices or disk drives 160A, 160B, 160C, . . . , 160N from dynamic container storage 150 of FIG. 2-3. It also shows an administrator or admin 170 using SCM 152 introduced above. Note that other elements from FIG. 2-3 have been omitted from FIG. 4 to facilitate focus on the present principles being taught.

According to the present design, admin 170 uses SCM 152 to provision storage devices for containerized environment 100 of FIG. 2-3. What this means is that admin 170 may add storage disk/drives/devices to containerized environment 100 and more specifically to container storage system/mechanism 150 during the course of the operation of the environment. Exemplarily for provisioning device 160C, admin 170 would first install the device/drive and have it recognized on host 102 shown in FIG. 2-3 using techniques known in the art. The admin would then use instant SCM 152 to partition or slice the device into its constituent partitions, slices or allocation units. Unless otherwise indicated, these terms, partitions, slices or allocation units are used synonymously in this disclosure.

The number of such allocation units or slices is given by the formula:

min(max.no.of slices allowed per device−1,⌊(device capacity−size of dm partition)/min. size of the allocation unit⌋).

Here, operator ⌊ ⌋ represents a floor or truncation operation. The first partition is reserved and serves a special purpose and that is why we see the term of "−1" in the above formula. Exemplarily, this first partition is referred to as dynamic metadata or "dm" partition for short. That is because it is used to store the metadata required for the operation of dynamic container storage 150 as will be further explained below. The maximum or max no. of slices allowed on a device may vary depending on OS 106 and other configuration parameters of environment 100. Typically, this number is 128.

Let us take an example where a newly added device 160C in FIG. 4 has a capacity of 120 GB as shown. The max. no. of slices allowed on the device is typically 128 per above. Let us now assume that the minimum size of an allocation unit that we would like in container storage 150 is 5 GB. Dm partitions may or may not have the same size for each of devices 160A, 160B, 160C, . . . 160N. In an exemplary implementation of the present technology, this size is 10 MB for each dm partition 162A, 162B, 162C, . . . shown in FIG. 4. Then the number of allocation units created by SCM 152 on device 160C will be min(128−1, ⌊(120 GB−10 MB)/5 GB⌋)=min(127, ⌊23.998⌋)=23. These allocation units or slices or partitions are marked by reference numeral 164C in FIG. 4. In addition, first dm partition 162C is also created by SCM 152.

According to the present design, the dm partition of each disk/device holds storage allocation persistence (SAP) metadata or simply SAP metadata/data for the device. Recall from above, that it is SCM 152 that is responsible for the creation of allocation units or slices on the devices on host 102. SAP data consists of the number of partitions/slices that exist on the device along with their respective partition ids. SAP data also includes a status indicator or flag to indicate whether the partition corresponding to a given partition id is allocated/in-use or otherwise unallocated/unused. In other words, SAP contains a list of partition ids on the device along with a flag that indicates whether the slice/partition is available for data storage or is otherwise already in use.

Let us now refer back to FIG. 3 to continue expanding our understanding of the various aspects of the present design. In addition to SCM 152 in dynamic container storage 150 of FIG. 2-4, there is also a container storage integration service (CSIS) or volume driver 154, a dynamic volume manager (DVM) 156 and a storage allocation module or engine (SAM) 158. Exemplary implementations of CSIS/driver based on instant principles include Docker volume driver, Kubernetes' container storage class or interface (CSI), Red Hat Openshift driver, rkt, etc.

The above subsystems or modules are responsible for dynamically "create"-ing, "delete"-ing, "mount"-ing and "unmount"-ing storage volumes based on the instant techniques taught herein. In variations, the functionalities of modules 152, 154, 156 and 158 shown in FIG. 3 and explained herein may be allowed to overlap merge. In other words, as needed, it may be possible to combine DVM 156 and SAM 158 into a single module, CSIS 154 and DVM 156 into a single module, etc.

Figure 5:
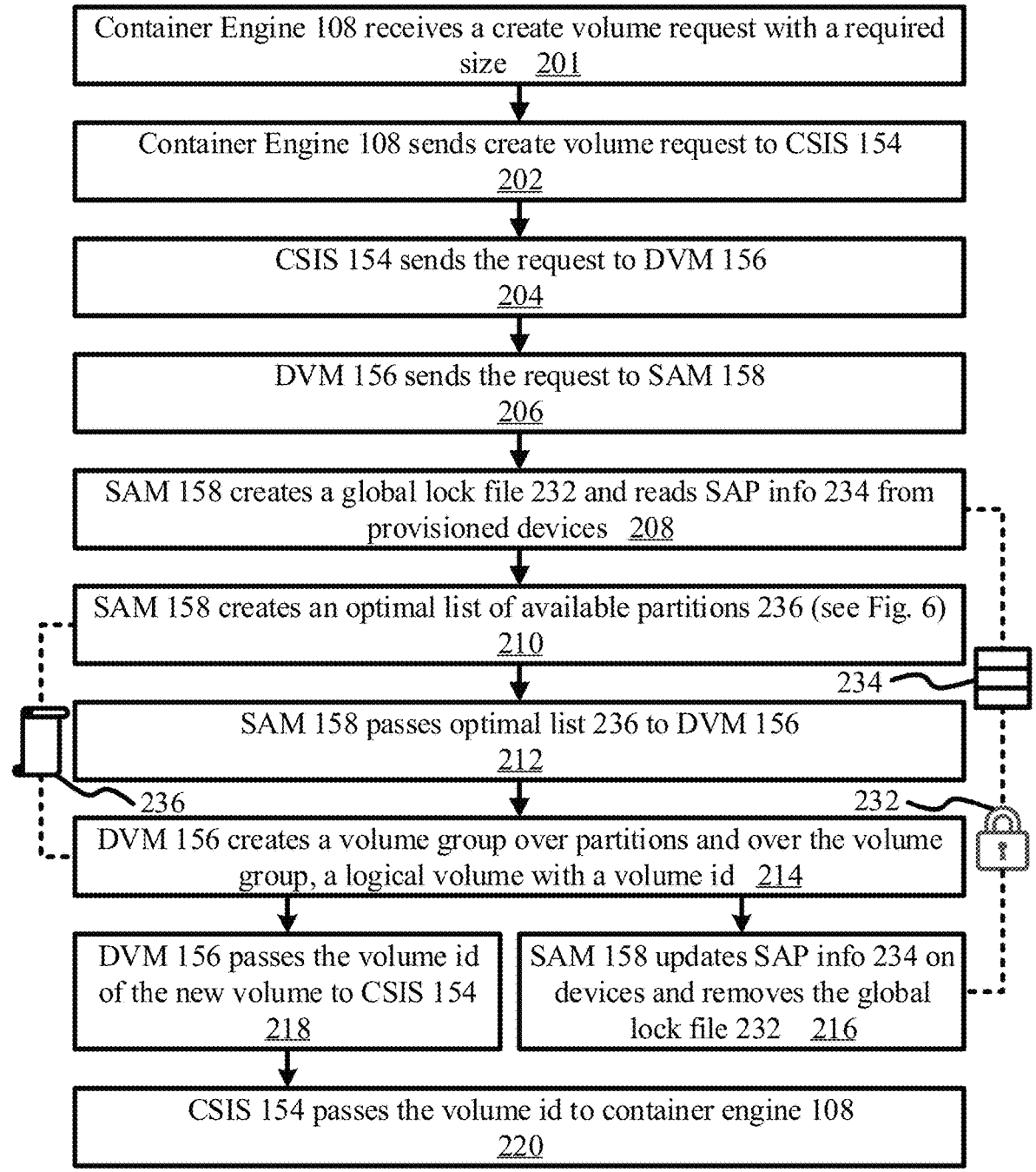
FIG. 5 shows the steps performed in a flowchart form by the dynamic container storage of the present design in order to dynamically allocate a storage volume of the required size on-demand.

In order to better understand the functionalities of these subsystems or components of dynamic container storage 150, let us now take advantage of the flow diagram or flowchart 200 shown in FIG. 5. First, recall from above that it is a user/container, for example, container 1 in FIG. 2-3 that initiates a request for a storage volume of a required size. Such an on-demand "create volume" request of a specified storage size afforded by the present techniques is then passed onto container engine 108 per above. This is shown by box/step 201 in flowchart 200. Container engine 108 now passes this request to CSIS 154 as shown by process block or step 202. CSIS 154 passes this request to DVM 156 per block or step 204. In turn, DVM 156 sends this request to SAM 158 as shown by block 206.

As shown by block 208, SAM 158 now creates a global lock file 232 shown by the lock symbol in FIG. 5. It then reads the storage allocation persistence (SAP) metadata/data 234 discussed above from dm partitions of each storage device provisioned/available on host 102. The reason it creates the lock file is to prevent another instance of SAM 158 from modifying the allocation information while it completes the current allocation request per below explanation. This locking in the present design ensures the integrity of SAP data 234 of dynamic container storage 150.

SAM 158 now creates an optimal list 236 of the partitions/slices on the various devices on host 102 that will satisfy the storage size requirement specified in the create volume request received by container engine 108 at step/block 201. This is shown by block/box 210. SAM 158 satisfies the size requirement by assembling or combining partitions/slices from the storage devices on host 102 in an optimum manner, and hence the term optimal list marked by numeral 236 in flowchart 200.

Let us now understand the tasks performed by SAM 158 at step/box 210 of flowchart 200 in a preferred embodiment in great detail. For this purpose, let us take advantage of flowchart flow diagram 250 shown in FIG. 6. In other words, flowchart 250 shows the operations of SAM 158 behind box 210 of flowchart 200 in an exploded/expanded form.

Figure 6:
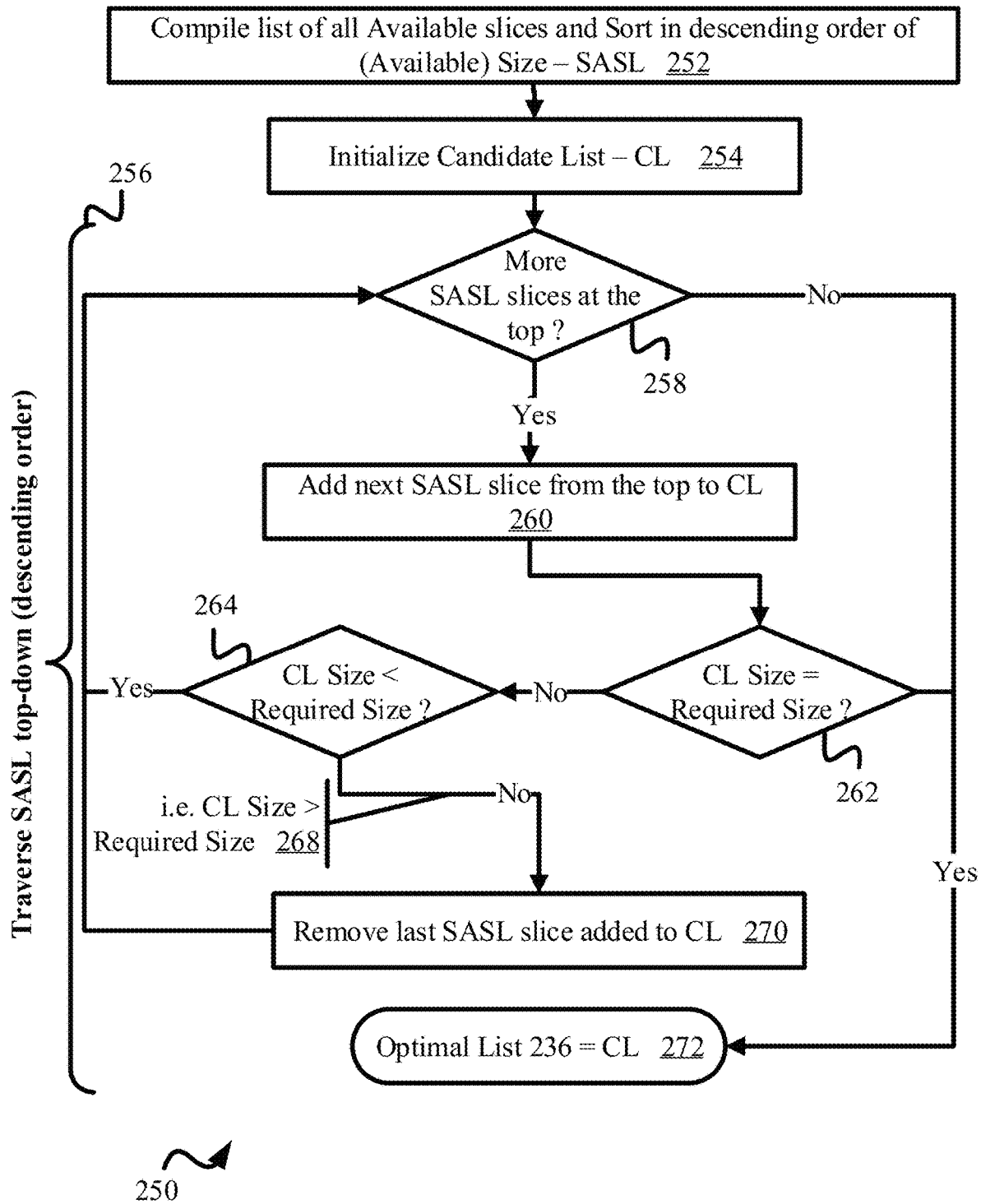
FIG. 6 shows the detailed steps taken by a storage allocation module (SAM) of the instant design for creating/assembling an optimal list of partition ids satisfying a create volume request of a specified size.

As a first step, SAM 152 creates a list of all slices/partitions on all the devices on host 102 that are marked as unused or available in the SAP data of their dm partitions. In a preferred embodiment, it does so by building an allocation information structure (AIS) in memory. AIS, not explicitly shown in FIG. 6, is a data structure containing the ids of all allocation units in all storage devices on host 102 along with the corresponding allocation flags indicating whether or not each allocation unit is available or unallocated.

Thus, based on AIS, SAM 158 constructs a list of all available/unallocated slices/partitions on the devices. It then sorts this list in descending order of the size of the slices or allocation units available to obtain a sorted, available slices list (SASL). The above steps of obtaining the SASL are collectively shown by box 252 in flowchart 250. SAM 158 then initializes a candidate list (CL) data structure whose purpose is to temporarily hold the ids of the slices during the construction/assembly of optimal list 236. This task/step is shown by box 254. SAM 158 then traverses SASL in a top-down fashion or descending order of the size of available slices as shown by brace 256 in FIG. 6.

Starting from the top of SASL, SAM 158 checks if there more slices available in its top-down traversal of SASL as shown by decision diamond 258. If the answer to this check/decision is No, then SAM 158 terminates its operation by providing the contents of CL as optimal list 236 at step/box 210 of FIG. 5 as will be explained further below. This step is shown by terminator 272 in FIG. 6. However, if there are more slices available at the top of SASL, then as shown by box 260, SAM 158 adds the next biggest slice/partition at the top of SASL to CL. In other words, SAM 158 operates in a "greedy" manner and adds the biggest available slices from the available storage devices first.

Now, as indicated by decision diamond 262, if the total size of the slices in CL, or simply put CL size, exactly matches the required size of storage in the create volume request at box 201 of FIG. 5, then SAM 158 is done. What this means is that, at this point optimal list or the best available list of slices to satisfy the above request are contained in the CL. Hence, SAM 158 outputs the contents of the CL as optimal list 236, as shown by terminator 272 of flowchart 250. Now, the storage allocation operation for create volume request of flowchart 200 of FIG. 5 resumes at its step/box 210 per further explanation below.

However, if the answer to decision diamond 262 is a No, then SAM 158 checks if the CL size is less than the required size. This check is shown by decision diamond 264. If the answer to this decision/check is a Yes, then SAM 158 continues its operation by going back to decision diamond 258 and checking to see if more slices are available in descending order from the top. If so, it adds the next available (biggest) slice per box 260 and continues per above explanation.

If the answer to decision diamond 264 is a No, then this means that CL size exceeds the required size in the original request. This is indicated by callout 268 in flowchart 250. In this case, SAM 158 removes the last slice added as candidate per box 270. It then returns to box 258 and the operation continues per above explanation. In other words, SAM 158 looks for the next smaller slice from the top in SASL and adds that to CL and performs checks 262, 264 again.

Thus, per box 270 SAM 158 modifies/improves upon its initial greedy choice of slice allocation and removes the excess storage. If there are no further smaller slices available at the top of SASL at decision diamond 258, then that could mean one of two scenarios, (i) either now CL contains enough slices that just/optimally exceed the required size of storage, (ii) or CL contains all available slices that it can but is still unable to fully satisfy the required size. In either scenario, SAM 158 completes the optimal list creation operation by outputting the contents of its CL as optimal list 236 per terminator 272 as shown. Now the process of storage allocation for create volume request of FIG. 5 can resume at its step/box 210 and per explanation further below.

Thus, referring back to FIG. 4, in the manner explained above, SAM 158 of dynamic container storage 150 of the present embodiment is able to allocate storage resources from devices 160A-N for satisfying the original create volume request at box 201 of flowchart 200, in the most resource and cost-efficient manner.

Let us now walk through a concrete example in concert with FIG. 4 and FIG. 6 to understand the present functionality of dynamic container storage 150, and more particularly SAM 158 in even greater detail. In the example shown in FIG. 4, allocation units or slices 164A are of 330 Gigabytes (GB) each on a device named sda (or /dev/sda) having a capacity of 1 Terabytes (TB). Slices 164B are of 1 TB each on a device named sdb (or /dev/sdb) with a capacity of 5.1 TB, and slices or allocation units 164C are of 18 GB each on device sdd (or /dev/sdd) with a capacity of 100 GB. The slices that are available for allocation amongst slices 164A-C have a white background while those that have already been allocated are shown with a hatched pattern.

Let us assume that the size required in the create volume request per above is 2.3 TB. Then according to the present embodiment, SAM 158 will make a list in descending order of size of available slices at step 252 of flowchart 250, and as a part of step/box 210 of flowchart 200. Per step/box 252, this list, referred to as sorted, available slices list or SASL will comprise of available slices amongst slices 164B (1 TB/slice), then 164A (330 GB/slice) and then 164C (18 GB/slice).

Next, SAM 158 will initialize a candidate list or CL per box 254. Based on the above explanation of flowchart 250, and specifically decision 258, box 260 and decisions 262, 264, SAM 158 will add 3 unallocated slices from slices 164B in CL. At decision/check 264 per above, SAM 158 will see that total CL size 3 TB exceeds the required size 2.3 TB per callout 268. Per box, 270, SAM 158 now removes the last of slices 164B that was added to CL. Per decision 258, box/step 260, and decisions 262 and 264 again, SAM 158 now adds slices from 164A until CL size exceeds 2.3 TB.

Now CL consists of two slices from 164B and two slices from 164A with a total candidate/CL size of 2*1 TB+2*300 GB=2.6 TB which exceeds 2.3 TB. Per box 270, SAM 158 now again removes the last slice added and adds slices from 164C until the size exceeds the required size. It thus adds 2 slices from 164C as candidates with a total CL size of 2*1 TB+300 GB+2*18 GB=2.336 GB which exceeds the required 2.3 TB.

However, now there are no smaller available/unallocated slices left at the top of SASL per decision 258. Therefore, SAM 158 stops and compiles the optimal list of slices as its CL, which in turn contains the ids of two unallocated slices A1 and A2 from slices 164B, 1 unallocated slice A3 from slices 164A and 2 unallocated slices A4 and A5 from slices 164C. In other words, as shown in FIG. 4, SAM 158 prepares optimal list 236 of the present example as consisting of 5 slices/partitions with partition ids A1, A2, A3, A4 and A5.

It should be noted that in other related variations, different implementations for SAM 158 are also conceivable within the present scope that generate a list of partitions that satisfy the size requirements of the create volume request. Such implementations may benefit from a number of resource allocation techniques and algorithms known in the art.

Let us now refer back to flowchart 200 of FIG. 5 in conjunction with FIG. 4. After having prepared optimal list 236 of slices that satisfy the requested size requirement at box 210 and per flowchart 250 above, SAM 158 passes this list to DVM 156. This is shown by box 212. Now DVM 156 creates a volume group 166 as shown in FIG. 4 over the list of partitions in optimal list 236 and further creates a logical volume 168 over volume group 166. The above step is shown by box/block 214 in FIG. 5 and volume group 166 is identified as volume group A in FIG. 4. Note that logical volume 168 over volume group 166 will have an associated volume id. DVM 156 will also create a filesystem on logical volume 168, although this step is not explicitly shown.

Depending on the operating system and abstractions for volume management available in environment 100, logical volume 168 may be created without the need to first create volume group 166, or the two steps may be combined together. Regardless, now SAM 158 updates SAP metadata/data 234 of devices having partitions in optimal list 236 that were allocated in the creation of the volume group. In our example above, the affected devices are sda, sdb and sdc. More specifically, SAM 158 updates the status or allocation flags for partitions A1, A2 in dm partition 162B of device sdb to indicate that these partitions are allocated or are no longer available. Similarly, it also updates the status flag for partition A3 in dm partition 162A of device sda to indicate that A3 is used.

Finally, SAM 158 also updates the status flags for partitions A4 and A5 in dm partition 162C of device sdc to indicate that these are no longer available. As indicated by block/box 216 in FIG. 5, once SAM 158 has updated SAP data 234 in the devices per above, it then deletes the global lock file 232. Thus, based on updated SAP data 234, when SAM 158 runs again to satisfy the next request, it would not reallocate partitions that have already been allocated.

At this point, a logical storage volume 168 has been created by DVM 156 of dynamic container storage 150 that satisfies the size requirement specified in the create volume request. DVM now passes the volume id of the newly created volume to CSIS 154 as shown by box 218 in FIG. 5. Then as shown by box 220, CSIS 154 in turn now passes this volume id to container engine 108 thus satisfying the create volume request of the specified on-demand size. Container engine 108 now in turn can provide this volume to the requesting container/user, although this step in not explicitly shown.

Note that in the practice of the present principles, there may be a create volume request followed by a request to mount the volume. Thus, after having received the volume id of the newly created volume per flowchart 200 above, the container/user may now mount the volume and start using it to persist data. As already noted above, the container may mount an existing volume using the interface of container engine 108 of FIG. 2-3. In alternative embodiments, create volume request may also mount the volume for the requesting container, thus obviating the need by the container to issue a separate mount command/request. In these embodiments, CSIS 154 mounts the created volume at step 220 and then passes the volume id of the newly created and mounted volume to container engine 108.

In any case, based on the present principles, dynamic container storage 150 of FIG. 2-4 is able to dynamically allocate storage space of required size on-demand to the containers of containerized environment 100. It does so by dynamically pooling available allocation units/slices/partitions from various devices on host 102, as explained above. Once the dynamically created volume is provided to a requesting container, it can now transparently persist data in the volume without requiring anything special. Furthermore, there is no user involvement needed in dynamically allocating storage for container applications.

In other variations, there may be more than one logical volumes created over a volume group as allowed by the architectural implementation of host 102 and/or storage devices 160A, 160B, . . . 160N. In still other preferred variations, any of storage devices 160A, 160B, . . . 160N may be in the cloud or employ a redundant array of independent disks (RAID) architecture. Any of these devices may be local or remote or in a public/private/hybrid cloud. Exemplary cloud technologies that may benefit from the present design include Amazon Web Services (AWS), Microsoft Azure, Google Cloud Platform, VMware, IBM Cloud, Rackspace, Red Hat, Oracle Cloud, etc.

Let us now also look at the converse aspects of decommissioning/deleting/destroying an existing volume that was created by dynamic container storage 150 of the present design per above. For this purpose, let us take advantage of flowchart 300 of FIG. 7. We begin at block/box/step 302 with container engine 108 receiving a request to delete a volume with a given volume id from a container or a user/operator on its behalf. Container engine 108 then passes this delete volume request to CSIS 154 per step/block 304. CSIS 154 passes the request to DVM 156 per step/block 306 which in turn passes it to SAM 158 per step/block 308.

In a similar manner as for creating a volume per flowchart 200 of FIG. 5, SAM 158 now creates a global lock file 332 and reads SAP 334 from dm partitions of all devices on host 102. It now builds allocation information structure (AIS) in memory as before, and determines the list of partitions 336 in the volume group on which the volume to be deleted exists. This is shown by block 312. SAM 158 then passes list 336 to DVM 156 per block 314. In-memory AIS provides for faster speed of operation of SAM as it processes storage allocation requests.

As shown by block 316, DVM 156 now deletes the logical volume with the volume id, and the underlying volume group containing the list of partitions/slices in list 336. Now SAM 158 updates the SAP data/metadata 334 in dm partitions of devices whose partitions were in list 336, as shown by block/box 318. It then marks/flags those slices/partitions on those devices as available or unallocated. Once it is done updating the SAP data, SAM 158 now deletes the global lock file 332. DVM 156 now notifies CSIS 154 that the requested volume to be delete has indeed been deleted. This is shown by box 320. Finally, as shown by box 322, CSIS 154 can inform container engine 108 that the delete volume request has been satisfied.

FIG. 8-10 show various screenshots of an exemplary implementation of the present design using docker software. Specifically, FIG. 8A and FIG. 8B present a single screenshot split into a left section 402A and a right section 402B respectively to allow a legible fit onto the drawing pages. The figures show a device /dev/sdb being added using SCM 152 of FIG. 3-4 and related explanation. Note that the script shown with reference numeral 404 houses the functionality of SCM 152 in this exemplary implementation.

FIG. 9 provides a screenshot 410 showing a modified docker volume create command 412 of the above explanation being used to create a zts-test-vol with an option/flag "--opt" and a "size" parameter of 500 MB. The bottom of the screenshot shows that zts-test-vol is clearly recognized by docker as a bona fide volume on the host. Finally, FIG. 10 provides a screenshot 420 showing the creation of a docker container running a MySQL database with storage volume zts-test-vol created in screenshot 410 of FIG. 9 above.

Note that in the practice of the present principles, there may be an unmount volume request preceded by the request to delete the volume per above. Thus, the container/user may first unmount the volume before requesting to delete it per flowchart 300 above. However, in alternative embodiments, delete volume request may also first unmount the volume for the requesting container, thus obviating the need by the container to issue a separate unmount command/request. In these embodiments, CSIS 154 at step/block 306 would first unmount the volume with its volume id before passing the delete volume request to DVM 156.

In additional variations, DVM 156 of FIG. 5 and FIG. 7 may be adapted to also provide encryption/decryption capabilities on the persistent data at-rest being stored by the volume. In other words, and referring to the flowchart 200, at step/box 214 DVM 156 may also be adapted to encrypt the logical volume over the volume group that it had just created. DVM may perform this encryption with an encryption key that it may first acquire from a key manager or a key management infrastructure. This way the data persisted by the container on the volume may be transparently encrypted/decrypted as it is written/read to/from the volume.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method executing by at least one microprocessor, computer-readable instructions stored in at least one non-transitory storage medium coupled to said at least one microprocessor, said method comprising the steps of:
   (a) executing a container engine on a host, said container engine making a request to create a storage volume of a required size for one or more containers managed by said container engine;
   (b) instructing a storage configuration manager (SCM) to provision one or more storage devices on said host and to partition said one or more storage devices into one or more partitions;
   (c) configuring said container engine to pass said request to a storage allocation module (SAM) via a container storage integration service (CSIS);
   (d) configuring said storage allocation module (SAM) to create a global lock file, and then to read storage allocation persistence (SAP) information from a first partition of each of said of one or more storage devices, and then to create an optimal list of one or more partition ids with corresponding partitions having a total size equal to or exceeding said required size;
   (e) configuring a dynamic volume manager (DVM) to create a logical volume over said corresponding partitions with partition ids in said optimal list, and then to pass a volume id of said logical volume to said container engine via said CSIS; and
   (f) further configuring said SAM to update said SAP in those of said of one or more storage devices whose partition ids are included in said optimal list and then to remove said global lock file.

2. The method of claim 1 implementing said CSIS as one of a Docker volume driver and a Kubernetes container storage interface (CSI).

3. The method of claim 1, utilizing one of a "docker run" and a "docker volume create" commands for said making of said request.

4. The method of claim 1, executing a composable application in a plurality of said one or more containers, said composable application persisting data in said storage volume.

5. The method of claim 1, providing said one or more storage devices locally on said host.

6. The method of claim 1, providing said one or more storage devices on one or more of a cloud storage, a redundant array of independent disks (RAID), a network attached storage (NAS) and a storage area network (SAN).

7. The method of claim 1, executing on an infrastructure-as-a-service (IaaS).

8. The method of claim 1, configuring said DVM to first create a volume group over said corresponding partitions with partition ids in said optimal list, and then to create said logical volume over said volume group.

9. The method of claim 1, configuring said SAM to build an allocation information structure (AIS) in memory from said SAP in said step (d).

10. The method of claim 1, configuring said SAM to create said optimal list by an initial greedy allocation and to then improve upon said initial greedy allocation by removing excess storage.

11. A computer-implemented method executing by at least one microprocessor, computer-readable instructions stored in at least one non-transitory storage medium coupled to said at least one microprocessor, said method comprising the steps of:
   (a) executing a container engine on a host, said container engine making a request to delete a storage volume having a volume id;
   (b) configuring said container engine to pass said request and said volume id to a container storage integration service (CSIS) integrated with said container engine;
   (c) configuring said CSIS to pass said request and said volume id to a storage allocation module (SAM);
   (d) configuring said SAM to create a global lock file and to read storage allocation persistence (SAP) information from a first partition of each of one or more storage devices and then to determine a list of one or more partitions comprising said storage volume;
   (e) configuring said SAM to pass said list to a dynamic volume manager (DVM) and configuring said DVM to delete said storage volume; and
   (f) configuring said SAM to mark as unused said SAP in those amongst said one or more storage devices having partitions in said list, and then to delete said global lock file.

12. A dynamic container storage system comprising at least one non-transitory storage medium storing computer-readable instructions and at least one microprocessor coupled to said at least one non-transitory storage medium for executing said computer-readable instructions, said system configured to:
   (a) execute a container engine on a host, wherein said container engine makes a request to create a storage volume of a required size for one or more containers managed by said container engine;
   (b) instruct a storage configuration manager (SCM) to provision one or more storage devices on said host and to partition said one or more storage devices into one or more partitions;

(c) provide said container engine to pass said request to a storage allocation module (SAM) via a container storage integration service (CSIS);

(d) provide said storage allocation module (SAM) to create a global lock file, and then to read storage allocation persistence (SAP) information from a first partition of each of said of one or more storage devices, and then to create an optimal list of one or more partition ids with corresponding partitions having a total size equal to or exceeding said required size;

(e) provide a dynamic volume manager (DVM) to create a logical volume over said corresponding partitions with partition ids in said optimal list, and then to pass a volume id of said logical volume to said container engine via said CSIS; and (f) further provide said SAM to update said SAP in those of said of one or more storage devices whose partition ids are included in said optimal list and then to remove said global lock file.

13. The system of claim 12, wherein said CSIS is implemented as one of a Docker volume driver and a Kubernetes container storage interface (CSI).

14. The system of claim 12, wherein one of a "docker run" and a "docker volume create" commands is used for said making of said request.

15. The system of claim 12, wherein a microservices application is executed in a plurality of said one or more containers, and wherein said microservices application persists data in said storage volume.

16. The system of claim 12, wherein said one or more storage devices exist locally on said host.

17. The system of claim 12, wherein said one or more storage devices exist on one or more of a cloud storage, a redundant array of independent disks (RAID), a network attached storage (NAS) and a storage area network (SAN).

18. The system of claim 12, implemented on an infrastructure-as-a-service (IaaS).

19. The system of claim 12, wherein said DVM first creates a volume group over said corresponding partitions with partition ids in said optimal list, and then creates said logical volume over said volume group.

20. The system of claim 12, wherein said SAM creates said optimal list by an initial greedy allocation and then improves upon said initial greedy allocation by removing excess storage.

* * * * *